United States Patent
Evans et al.

(10) Patent No.: US 10,066,483 B2
(45) Date of Patent: Sep. 4, 2018

(54) FRICTION BOLT ASSEMBLY

(71) Applicant: DYWIDAG-SYSTEMS INTERNATIONAL PTY LIMITED, Bennett's Green, NSW (AU)

(72) Inventors: David William Evans, Rankin Park (AU); Derek Colin Hird, New Lambton (AU)

(73) Assignee: DYWIDAG-SYSTEMS INTERNATIONAL PTY LIMITED, Bennett's Green, NSW (AU)

(*) Notice: Subject to any disclaimer, the term of this patent is extended or adjusted under 35 U.S.C. 154(b) by 0 days.

(21) Appl. No.: 14/907,909

(22) PCT Filed: Jul. 29, 2014

(86) PCT No.: PCT/AU2014/000757
§ 371 (c)(1),
(2) Date: Jan. 27, 2016

(87) PCT Pub. No.: WO2015/013743
PCT Pub. Date: Feb. 5, 2015

(65) Prior Publication Data
US 2016/0186564 A1  Jun. 30, 2016

(30) Foreign Application Priority Data

Jul. 30, 2013 (AU) ................. 2013902819
Dec. 19, 2013 (AU) ................. 2013904972

(51) Int. Cl.
*E21D 21/00* (2006.01)
*F16B 13/06* (2006.01)
(Continued)

(52) U.S. Cl.
CPC ......... *E21D 21/004* (2013.01); *E21D 20/003* (2013.01); *E21D 21/008* (2013.01);
(Continued)

(58) Field of Classification Search
CPC ............ E21D 20/028; E21D 2021/006; E21D 20/025; E21D 20/02; E21D 20/021
(Continued)

(56) References Cited

U.S. PATENT DOCUMENTS 2,442,113 A * 5/1948 Beijl ..................... E21D 9/00
405/138
2,673,452 A * 3/1954 Glaze ................. E21D 20/003
173/152

(Continued)

FOREIGN PATENT DOCUMENTS

WO   2012/071625 A1   6/2012
ZA   2012/07431      5/2013

OTHER PUBLICATIONS

Notification of Material Filed Under Section 27 dated Mar. 29, 2016 from corresponding Australian Application No. 2014295892, 5 pages.

(Continued)

*Primary Examiner* — Benjamin F Fiorello
*Assistant Examiner* — Edwin J Toledo-Duran
(74) *Attorney, Agent, or Firm* — Ohlandt, Greeley, Ruggiero & Perle, LLP

(57) ABSTRACT

A friction bolt assembly has a tubular friction bolt body defining a cavity and having a split. A rod extends through the cavity. An expansion element is mounted on the rod at or toward the rod leading end and protrudes through the friction bolt body leading end. The expansion element has an engagement surface tapering toward the rod trailing end. A drive head is mounted on the rod at or adjacent the rod trailing end. The rod is actuatable by rotation of the drive head to draw the expansion element toward the friction bolt (Continued)

body trailing end such that the engagement surface engages the friction bolt body, radially outwardly deforming the friction bolt body.

23 Claims, 21 Drawing Sheets

(51) Int. Cl.
*F16B 13/08* (2006.01)
*E21D 20/00* (2006.01)

(52) U.S. Cl.
CPC ........ *E21D 21/0033* (2013.01); *F16B 13/063* (2013.01); *F16B 13/065* (2013.01); *F16B 13/0858* (2013.01)

(58) Field of Classification Search
USPC ......... 405/259.1, 259.2, 259.3, 259.4, 259.6, 405/262, 259.5
See application file for complete search history.

(56) References Cited

U.S. PATENT DOCUMENTS

| | | | | |
|---|---|---|---|---|
| 2,741,461 A * | 4/1956 | Joy | E21D 20/003 | 173/150 |
| 3,311,012 A * | 3/1967 | Williams | E21D 20/021 | 405/259.5 |
| 3,973,409 A * | 8/1976 | Asayama | E02D 5/74 | 175/292 |
| 4,056,036 A * | 11/1977 | Kamann | E02D 5/80 | 405/259.5 |
| 4,140,428 A * | 2/1979 | McLain | E21D 21/0006 | 405/259.6 |
| 4,194,858 A * | 3/1980 | Evans | E21D 20/025 | 405/259.3 |
| 4,226,559 A * | 10/1980 | Prebensen | E21B 7/025 | 173/184 |
| 4,274,762 A * | 6/1981 | Johnson | E21D 20/00 | 405/259.1 |
| 4,305,687 A * | 12/1981 | Parker | E21D 21/0046 | 405/259.3 |
| 4,313,628 A * | 2/1982 | Duenke | F16L 31/00 | 285/115 |
| 4,316,677 A * | 2/1982 | Ciavatta | E21D 20/02 | 405/259.1 |
| 4,322,183 A * | 3/1982 | Ciavatta | E21D 20/02 | 405/259.5 |
| 4,344,599 A * | 8/1982 | Herron | E21B 3/04 | 173/28 |
| 4,347,020 A * | 8/1982 | White | E21D 20/025 | 405/259.1 |
| 4,351,625 A * | 9/1982 | Selestam | E21C 11/00 | 173/184 |
| 4,398,850 A * | 8/1983 | Talvensaari | E21D 20/006 | 173/193 |
| 4,430,025 A * | 2/1984 | Ciavatta | E21D 20/02 | 405/259.1 |
| 4,437,795 A | 3/1984 | White | | |
| 4,588,037 A * | 5/1986 | Combet | E21D 20/003 | 173/192 |
| 4,655,643 A * | 4/1987 | Lane | E21D 20/025 | 405/259.5 |
| 4,661,022 A * | 4/1987 | Seegmiller | E21D 21/004 | 405/259.5 |
| 4,708,533 A * | 11/1987 | Leppanen | E21D 20/028 | 137/355.12 |
| 4,732,509 A * | 3/1988 | Leppanen | E21D 20/028 | 405/259.5 |
| 4,759,888 A * | 7/1988 | Brest van Kempen | E21D 20/02 | 264/35 |
| 5,076,734 A * | 12/1991 | Hipkins, Sr. | E21D 20/025 | 405/259.5 |
| 5,082,399 A * | 1/1992 | Frease | E21D 21/0093 | 405/259.5 |
| 5,114,279 A * | 5/1992 | Bjerngren | E21D 20/006 | 405/259.1 |
| 5,165,825 A * | 11/1992 | Wallin | E21D 20/003 | 405/259.6 |
| 5,244,314 A * | 9/1993 | Calandra, Jr. | E21D 21/008 | 405/259.4 |
| 5,441,372 A * | 8/1995 | Wilkinson | F16B 13/066 | 405/259.5 |
| 6,447,210 B1 * | 9/2002 | Coombs | E21D 20/025 | 405/259.5 |
| 7,381,013 B1 * | 6/2008 | Rataj | E21D 21/0033 | 405/259.3 |
| 7,407,344 B2 * | 8/2008 | Hinshaw | E21D 20/006 | 175/52 |
| 7,416,033 B2 * | 8/2008 | Hinshaw | E21D 20/003 | 175/122 |
| 7,481,603 B1 * | 1/2009 | Fox | E21D 20/025 | 405/259.1 |
| 7,607,866 B2 * | 10/2009 | Eddowes | E21B 19/086 | 211/70 |
| 2002/0119014 A1 * | 8/2002 | Coombs | E21D 20/025 | 405/269 |
| 2004/0161316 A1 * | 8/2004 | Locotos | E21D 20/025 | 411/82 |
| 2004/0165958 A1 * | 8/2004 | McLaren | E21D 20/02 | 405/259.6 |
| 2007/0031196 A1 * | 2/2007 | Bruneau | E21D 21/0026 | 405/259.4 |
| 2007/0141297 A1 * | 6/2007 | Buxton | E21D 20/028 | 428/66.3 |
| 2007/0243026 A1 * | 10/2007 | Wu | E21D 20/025 | 405/259.5 |
| 2008/0110640 A1 * | 5/2008 | Bernthaler | E02D 5/76 | 166/382 |
| 2009/0052995 A1 * | 2/2009 | Eriksson | E21D 20/028 | 405/259.5 |
| 2009/0136302 A1 * | 5/2009 | Fox | E21D 20/025 | 405/259.5 |
| 2011/0311315 A1 * | 12/2011 | Evans | E21D 21/004 | 405/259.3 |
| 2012/0034036 A1 * | 2/2012 | Davison | E21D 20/02 | 405/259.5 |
| 2012/0163924 A1 * | 6/2012 | Rataj | E21D 21/0033 | 405/259.3 |
| 2014/0112724 A1 * | 4/2014 | Nelson | E21D 20/00 | 405/259.1 |
| 2015/0267537 A1 * | 9/2015 | Smit | E21D 20/026 | 405/259.2 |
| 2015/0300171 A1 * | 10/2015 | Davison | E21D 20/025 | 405/259.6 |
| 2016/0115789 A1 * | 4/2016 | Nystrom | E21D 20/02 | 221/1 |

OTHER PUBLICATIONS

International Search Report dated Aug. 26, 2014 from corresponding PCT/AU2014/000757, 8 pages.
Written Opinion dated Aug. 26, 2014 from corresponding PCT/AU2014/000757, 6 pages.

* cited by examiner

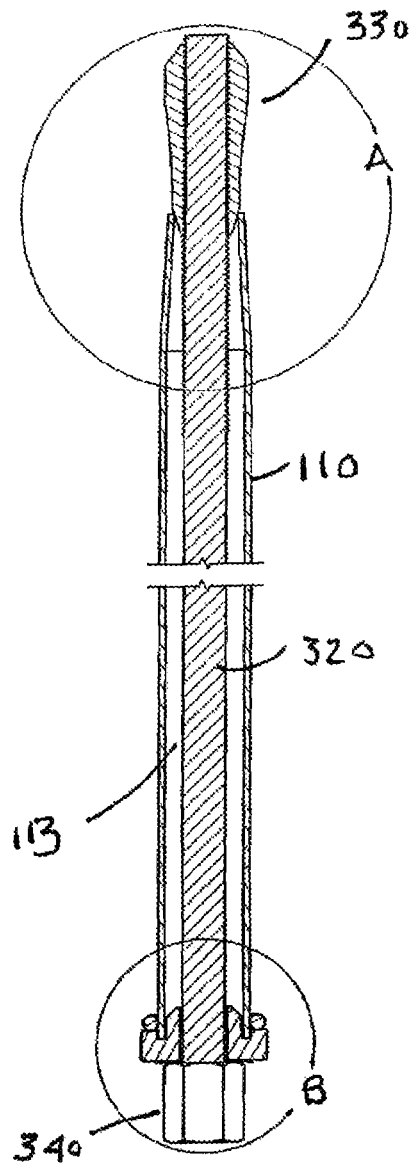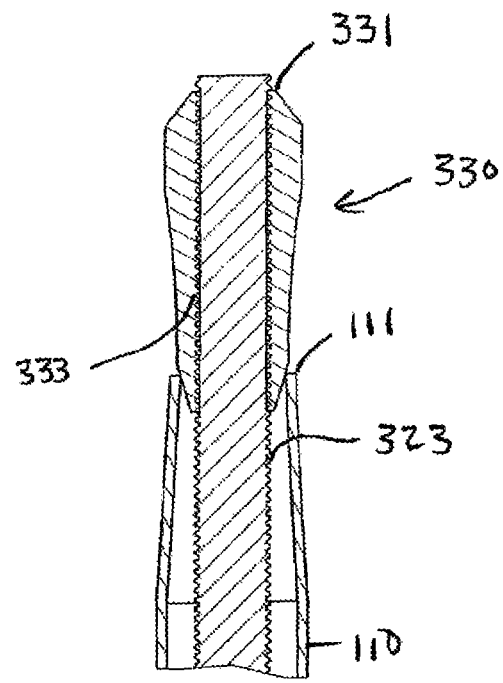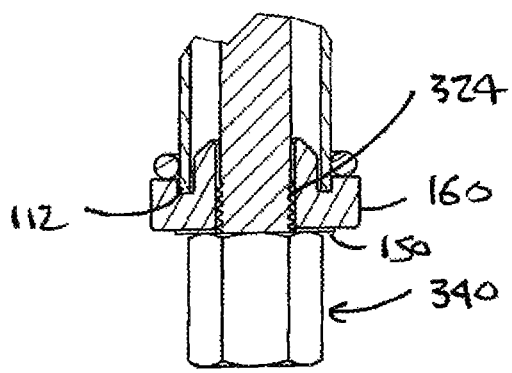
Fig. 15
Fig. 16
Fig. 17

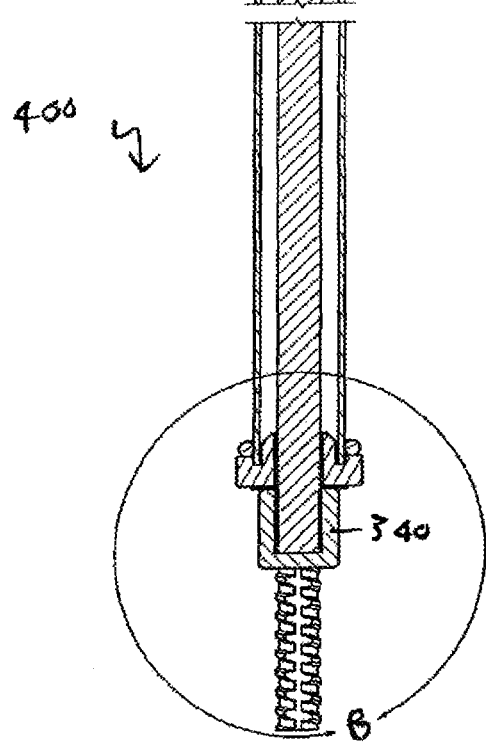
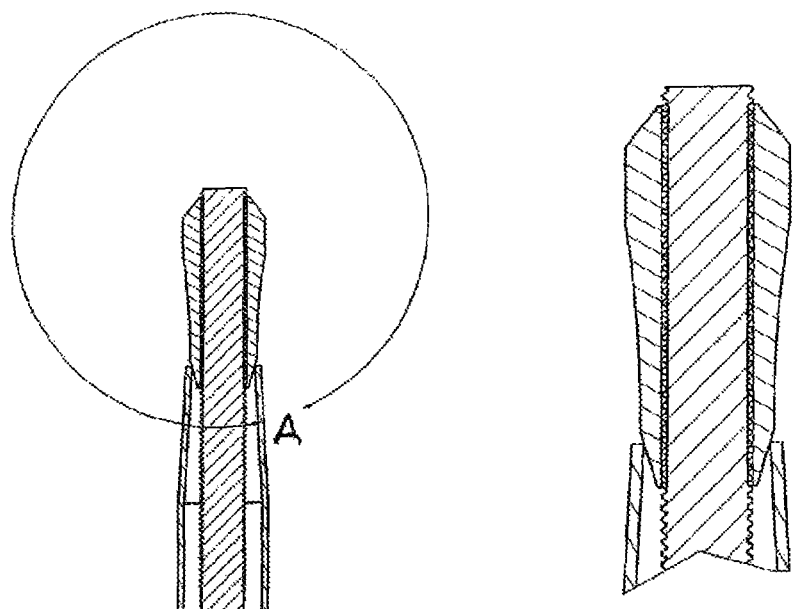
Fig. 22
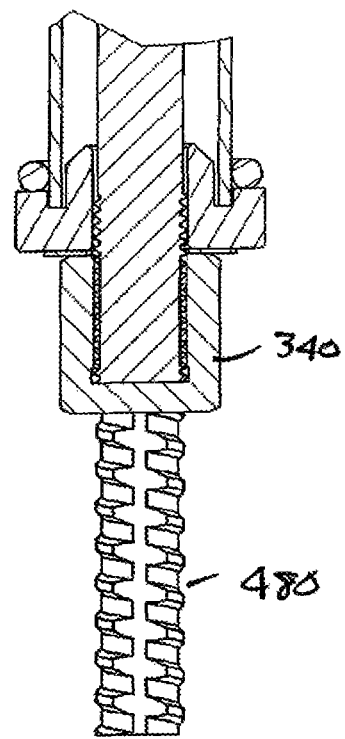
Fig. 21
Fig. 23

FRICTION BOLT ASSEMBLY

BACKGROUND

1. Field of the Disclosure

The present disclosure relates to strata control in civil engineering and mining operations and in particular relates to a friction bolt assembly for securing the roof or wall of a mine, tunnel or other ground excavations.

2. Discussion of the Background Art

A current method of stabilizing the roof or wall of an underground mine involves the use of friction bolts, otherwise known as friction rock stabilizers. Friction bolts have a generally cylindrical body and a collar welded to the trailing end of the body. The leading end portion of the body is generally tapered to assist in inserting the friction bolt into a bore hole drilled into the rock strata. The body is split down one side such that, when it is driven into a slightly undersized hole in the rock strata, the friction bolt body elastically deforms to reduce the size of the split in the body. This elastic deformation exerts radial forces against the wall of the hole, providing a corresponding frictional force, retaining the friction bolt within the hole. A plate washer is fitted to the body directly above the collar such that the collar bears the plate washer against the rock face of the mine to distribute axial loads carried by the friction bolt across the face of the roof.

The frictional forces generated between the friction bolt and bore hole wall are at times insufficient to properly anchor the friction bolt within the bore hole. Accordingly, developments have been proposed to improve the transfer of load between the friction bolt and bore hole wall, including by filling the friction bolt with grout to increase its rigidity and to outwardly radially deform the friction bolt body following initial installation.

DISCLOSURE

It is an object of the present disclosure to provide an improved friction bolt, or at least to provide a useful alternative to presently available friction bolts.

SUMMARY

In a first aspect the present disclosure provides a friction bolt assembly comprising:

a generally tubular friction bolt body longitudinally extending between a friction bolt body leading end and a friction bolt body trailing end, said friction bolt body defining a cavity longitudinally extending through said friction bolt body and having a split longitudinally extending along said friction bolt body to said friction bolt body leading end;

a rod longitudinally extending through said cavity between a rod leading end and a rod trailing end;

an expansion element mounted on, or integrally formed with, said rod and protruding through said friction bolt body leading end, said expansion element having an engagement surface tapering toward said rod trailing end; and a drive head mounted on, or integrally formed with, said rod at or adjacent said rod trailing end, said rod being actuatable by rotation of said drive head to draw said expansion element toward said friction bolt body trailing end such that said engagement surface engages said friction bolt body at said friction bolt body leading end, radially outwardly deforming said friction bolt body at said friction bolt body leading end;

wherein said friction bolt assembly further comprises means for at least substantially preventing rotation of said expansion element relative to said friction bolt body.

In one or more embodiments, said expansion element is located at or adjacent said rod leading end.

In one or more embodiments, said means comprises a surface feature of said expansion element configured to engage said friction bolt body. In one embodiment, said surface feature comprises a key projecting from said engagement surface into said split.

In one or more embodiment, said expansion element is located at or adjacent said rod leading end.

In an alternative embodiment, said means comprises one or more welds fixing said expansion element to said friction bolt body, said one or more welds being configured to fail upon application of a predetermined load tending to draw said expansion element toward said friction bolt body trailing end.

In one or more embodiments, said drive head is threadingly mounted on a threaded trailing portion of said rod such that, upon actuation of said rod by rotation of said drive head, said threaded trailing portion of said rod is drawn through said drive head. In one embodiment, said expansion element remains fixed in relation to said rod during said actuation of said rod. In another embodiment, said expansion element is threadingly mounted on a threaded leading portion of said rod, said threaded leading portion and said threaded trailing portion of said rod being like-handed.

In one or more embodiments, said expansion element is threadingly mounted on a threaded leading portion of said rod such that, upon actuation of said rod by rotation of said drive head, said rod rotates with said drive head, drawing said expansion element along said threaded leading portion of said rod. In one embodiment, said drive head remains fixed in relation to said rod during said actuation.

Typically, said friction bolt assembly further comprises a load transfer fitting mounted on said rod between said drive head and said friction bolt body trailing end, said load transfer fitting having a profiled leading face configured to engage and support said friction bolt body trailing end.

In a second aspect the present disclosure provides a friction bolt assembly comprising:

a generally tubular friction bolt body longitudinally extending between a friction bolt body leading end and a friction bolt body trailing end, said friction bolt body defining a cavity longitudinally extending through said friction bolt body and having a split longitudinally extending along said friction bolt body to said friction bolt body leading end;

a rod longitudinally extending through said cavity between a rod leading end and a rod trailing end;

an expansion element mounted on, or integrally formed with, said rod and protruding through said friction bolt body leading end, said expansion element having an engagement surface tapering toward said rod trailing end; and a drive head mounted on, or integrally formed with, said rod at or adjacent said rod trailing end, said rod being actuatable by rotation of said drive head to draw said expansion element toward said friction bolt body trailing end such that said engagement surface engages said friction bolt body at said friction bolt body leading end, radially outwardly deforming said friction bolt body at said friction bolt body leading end;

wherein said friction bolt body has a tapered leading portion tapering to said friction bolt body leading end, the maximum diameter of said engagement surface being greater than the internal diameter of said friction bolt body at said friction bolt body leading end and less than the maximum diameter of said friction bolt body.

In one or more embodiments, said expansion element is located at or adjacent said rod leading end.

In one or more embodiments, said drive head is threadingly mounted on a threaded trailing portion of said rod such that, upon actuation of said rod by rotation of said drive head, said threaded trailing portion of said rod is drawn through said drive head. In one embodiment, said expansion element remains fixed in relation to said rod during said actuation of said rod. In another embodiment, said expansion element is threadingly mounted on a threaded leading portion of said rod, said threaded leading portion and said threaded trailing portion of said rod being like-handed.

In one or more embodiments, said expansion element is threadingly mounted on a threaded leading portion of said rod such that, upon actuation of said rod by rotation of said drive head, said rod rotates with said drive head, drawing said expansion element along said threaded leading portion of said rod. In one embodiment, said drive head remains fixed in relation to said rod during said actuation.

Typically, said friction bolt assembly further comprises a load transfer fitting mounted on said rod between said drive head and said friction bolt body trailing end, said load transfer fitting having a profiled leading face configured to engage and support said friction bolt body trailing end.

In a third aspect the present disclosure provides a method of installing any of the friction bolt assemblies defined above, comprising the steps of:

drilling a bore hole into a rock face of a rock strata to be stabilized, said bore hole having a diameter greater than the maximum diameter of said expansion element and less than the maximum diameter of said friction bolt body;

inserting said friction bolt assembly into said bore hole with said expansion element leading;

applying percussive force to said friction bolt body to drive said friction bolt body into said bore hole with an interference fit;

rotating said drive head to actuate said rod, drawing said expansion element towards said friction bolt body trailing end and engaging said engagement surface with said friction bolt body at said friction bolt leading end thereby outwardly radially deforming said friction bolt body at said friction bolt body leading end into bearing engagement with the wall of said bore hole.

BRIEF DESCRIPTION OF THE DRAWINGS

Preferred embodiments of the present disclosure will now be described, by way of example only, with reference to the accompanying drawings wherein:

FIG. 15 is a cross-sectional view of the friction bolt assembly of FIG. 13, taken at section 15-15 of FIG. 14;

FIG. 16 is an enlarged view of detail A of FIG. 15;

FIG. 17 is an enlarged view of detail B of FIG. 15;

FIG. 21 is a partially cross-sectioned view of the friction bolt assembly of FIG. 20;

FIG. 22 is an enlarged view of detail A of FIG. 21; and

FIG. 23 is an enlarged view of detail B of FIG. 21.

DETAILED DESCRIPTION OF THE PREFERRED EMBODIMENT

Figure 1:
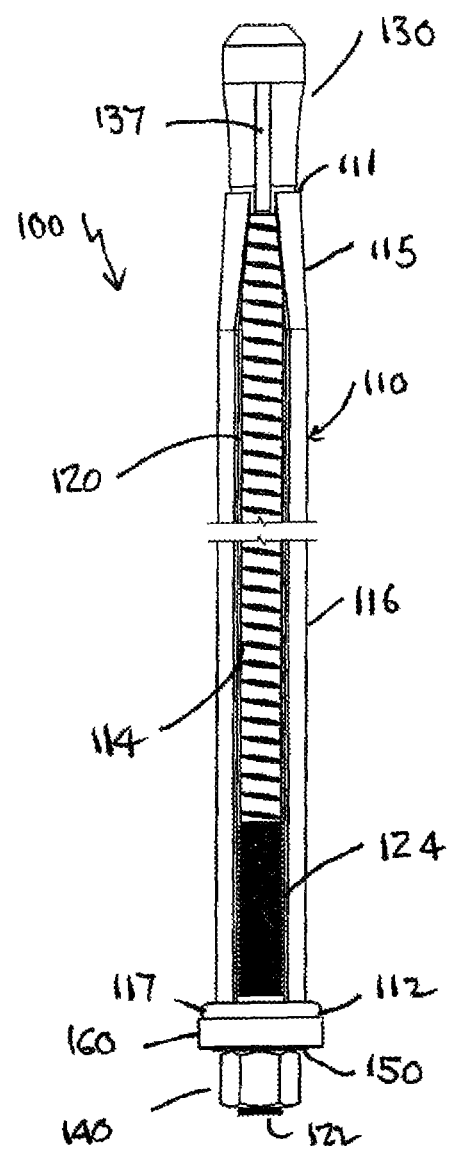
FIG. 1 is a front elevation view of a friction bolt assembly according to a first embodiment.
Figure 2:
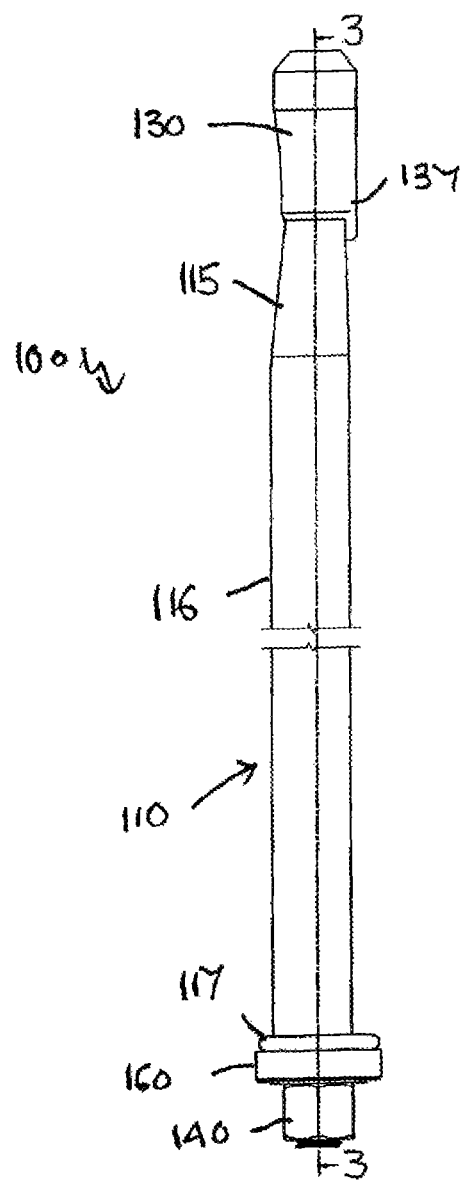
FIG. 2 is side elevation view of the friction bolt assembly of FIG. 1.

A friction bolt assembly 100 according to a first embodiment is depicted in FIGS. 1 to 8 of the accompanying drawings. The friction bolt assembly 100 has a generally tubular friction bolt body 110 that longitudinally extends between a friction bolt body leading end 111 and a friction bolt body trailing end 112. The friction bolt body 110 defines a cavity 113 longitudinally extending through the friction bolt body 110. The friction bolt body 110 has a split 114 extending along the friction bolt body 110 to the friction bolt body leading end 111 to allow for radial compression of the friction bolt body 110 in the usual manner. Here the split 114 extends along the full length of the friction bolt body 110 from the friction bolt body trailing end 112. The friction bolt body 110 has a tapered leading portion 115 that tapers toward the friction bolt body leading end 111 in the usual manner to enable the friction bolt body 110 to be driven into a bore hole having a smaller diameter than the constant diameter of the primary portion 116 of the friction bolt body 110. A collar 117, in the general form of a torus, is welded to the friction bolt body 110 adjacent the friction bolt body trailing end 112. In one embodiment, the external diameter of the primary portion 116 of the friction bolt body 110, being the maximum diameter of the friction bolt body 110, is approximately 47 mm, whilst the cross-section of the leading portion 115 of the friction bolt body 110 at the friction bolt body leading end 111 is of a reduced cross-sectional area, being the minimum cross-sectional area of the friction bolt body 110. In one embodiment, the cross-section of the leading portion 115 at the friction bolt body leading end 111 is of an oval configuration having a major axis (maximum) diameter of 40 mm and minor axis diameter of 26 mm, although it is also envisaged that the leading portion 115 at the friction bolt leading 111 may be generally circular. The wall thickness of the friction bolt body 110 is here approximately 3 mm. The friction bolt body 110 is typically formed of structural grade steel.

Figure 3:
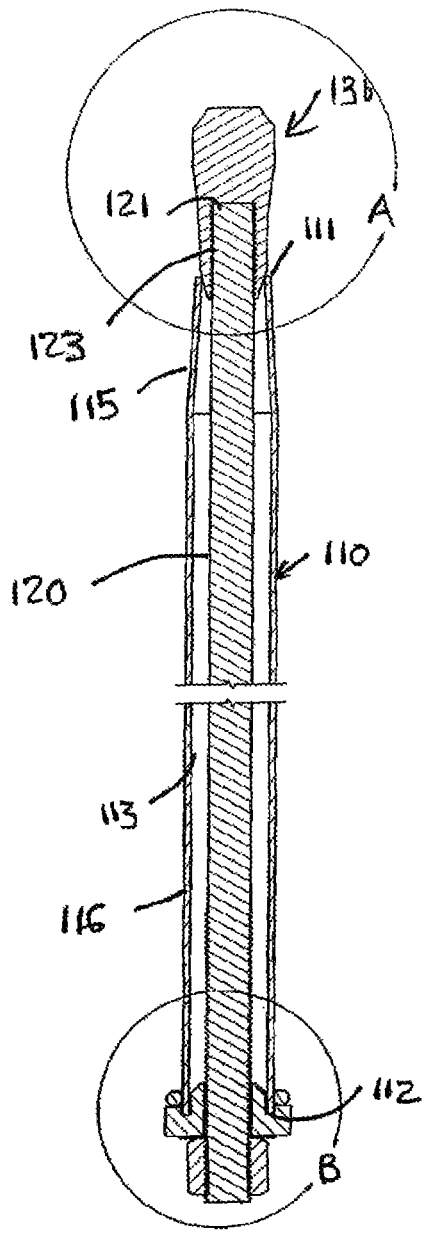
FIG. 3 is cross-sectional view of the friction bolt assembly of FIG. 1, taken at section 3-3 of FIG. 2.
Figure 4:
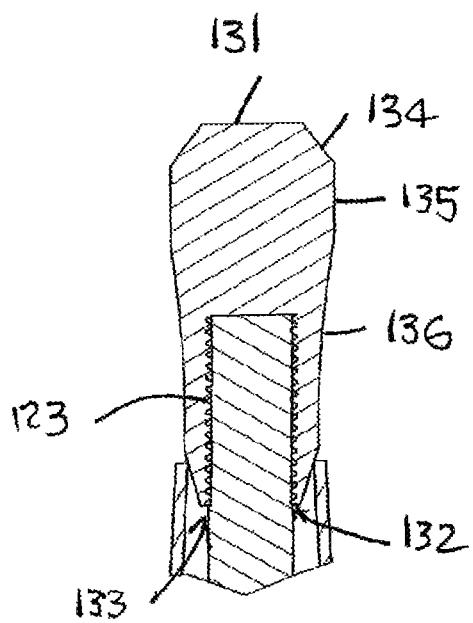
FIG. 4 is an enlarged view of detail A of FIG. 3.
Figure 5:
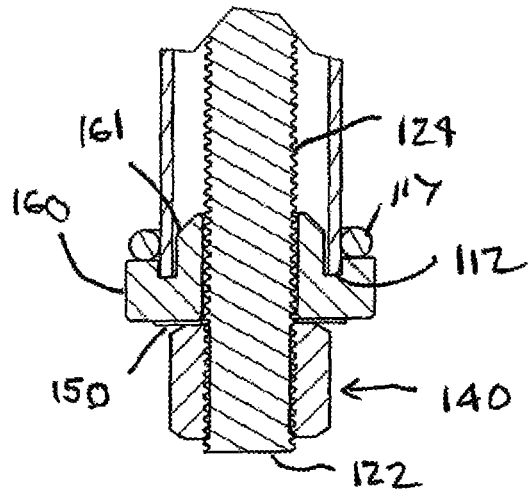
FIG. 5 is an enlarged view of detail B of FIG. 3.

The friction bolt assembly 100 further includes an elongate rod 120 longitudinally extending through the cavity 113 in the friction bolt body 110 between a rod leading end 121 and a rod trailing end 122. The rod 120 is typically formed of rigid steel bar. An expansion element 130 is mounted on the rod 120. The expansion element 130 is typically located toward the rod leading end 121 and in the embodiment depicted the expansion element 130 is located at or adjacent the rod leading end 121. As best shown in FIGS. 3 and 4, in the embodiment depicted, the expansion element 130 is threadingly mounted onto a threaded leading portion 123 of the rod 120. The threaded leading portion 123 of the rod 120 is received within a blind aperture 133 extending through the expansion element trailing end 132. It is also envisaged, however, that the expansion element 130 may be mounted on the rod 120 by alternate means, such as welding, or may alternatively be integrally formed with the rod 120. The expansion element 130 is in the general form of a body of revolution having a frusto-conical tapered leading surface 134 extending and tapering to a closed expansion element leading end 131, a generally cylindrical mid-surface 135 trailing the leading surface 134 and defining the maximum diameter of the expansion element 130 and a trailing generally frusto-conical engagement surface 136 that tapers, here in a non-linear manner, from the mid-surface 135 to the expansion element trailing end 132. Here the engagement surface 136 has a slightly concave form. In the embodiment depicted, the maximum diameter of the expansion element 130, defined by the mid-surface 135, is approximately 43 mm. This is greater than the internal diameter of the friction bolt body 110 at the friction bolt body leading end 111 and less than the maximum diameter of the friction bolt body 110.

Figure 6:
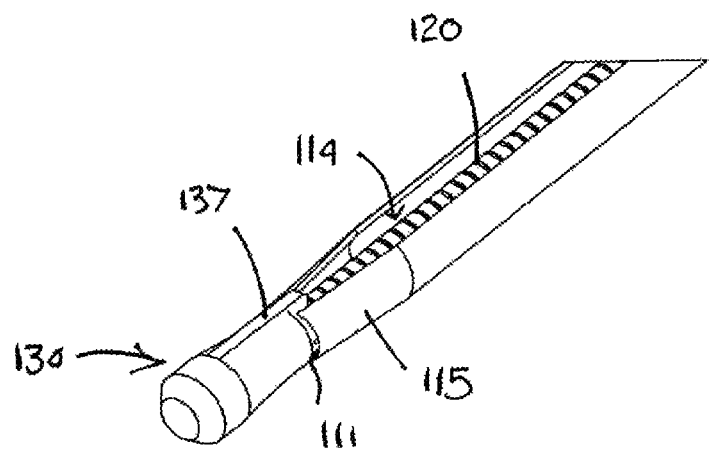
FIG. 6 is a fragmentary isometric view of the leading portion of the friction bolt assembly of FIG. 1.
Figure 7:
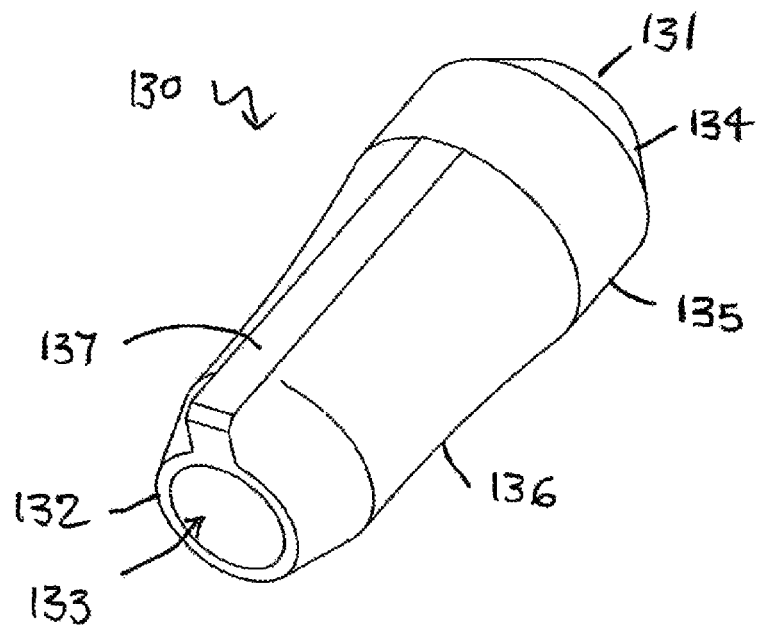
FIG. 7 is an isometric view of the expansion element of the friction bolt assembly of FIG. 1.
Figure 8:
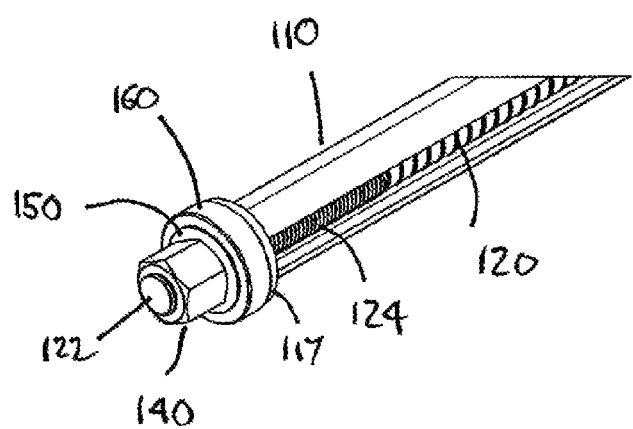
FIG. 8 is a fragmentary isometric view of the trailing portion of the friction bolt assembly of FIG. 1.

As best depicted in FIGS. 6 and 7, the expansion element 130 may further comprise means, for at least substantially preventing rotation of the expansion element 130 relative to the friction bolt body 110. In the first embodiment, the means is in the form of a surface feature of the expansion element 130, particularly in the form of a key 137. The key 137 projects from, and is integrally formed with, the engagement surface 136 and extends from the expansion element trailing end 132 to the mid-surface 135. As shown in FIGS. 1 and 6, the key 137 projects into the split 114 formed in the friction bolt body 110. As a result, rotation of the rod 120, which would tend to rotate the expansion element 130, results in the key 137 engaging an edge of the friction bolt body 110 bounding the split 114, preventing relative rotation, at least beyond minor movement associated with the free play of the key 137 within the slightly broader width of the split 114 at the friction bolt leading end 111.

The friction bolt assembly 100 further comprises a drive head 140 mounted on the rod 120 at or adjacent the rod trailing 122. In the particular embodiment depicted, the drive head 140 is in the form of an open hexagonal nut that is threadingly mounted on a threaded trailing portion 124 of the rod 120. A sacrificial plastic sheathing may cover the exposed region of the threaded trailing portion 124 so as to avoid the thread of the threaded trailing portion 124 being fouled by debris during transport and handling in the mine. Between the drive head 140 and the friction bolt body trailing end 112, a washer 150 and load transfer fitting 160 are mounted on the threaded trailing portion 124 of the rod 120. The load transfer fitting 160 has a profiled leading face 161 configured to engage and support the friction bolt body trailing end 112 and collar 117 to transfer percussive loads applied during installation, as will be discussed further below, to the friction bolt body 110 without locally damaging the friction bolt body 110.

Figure 9:
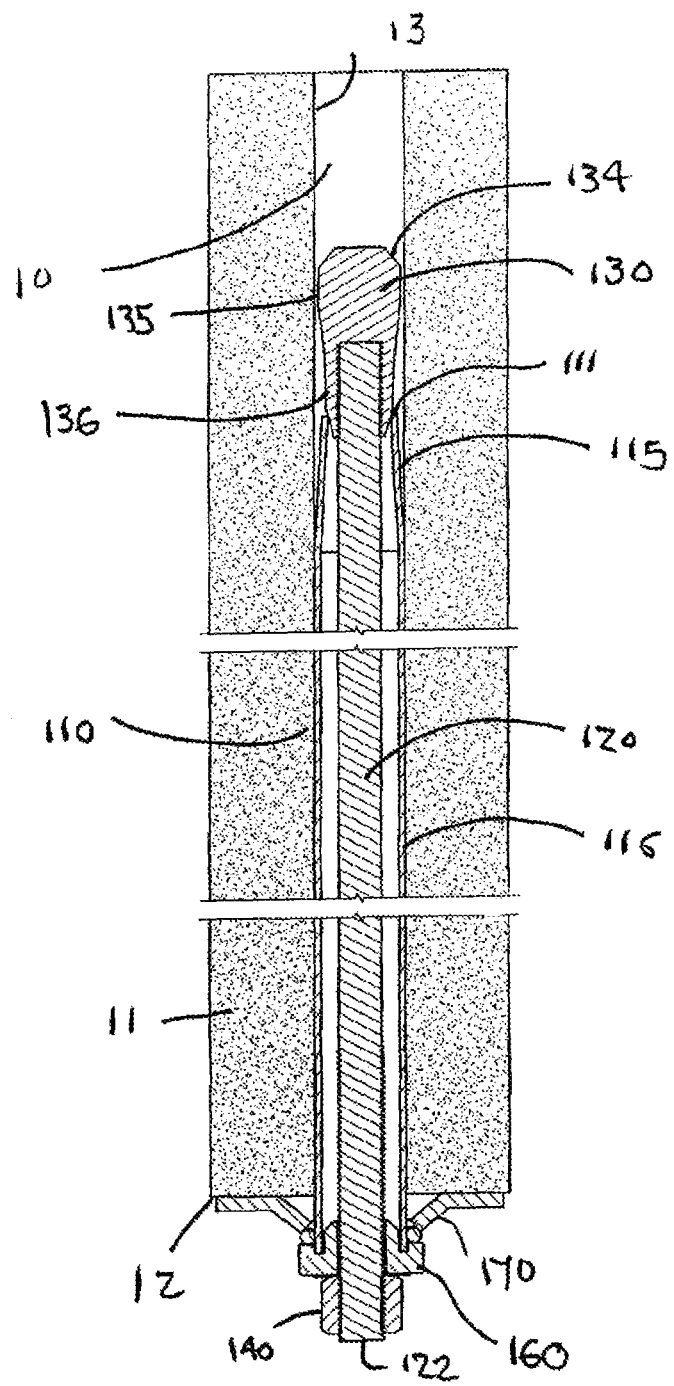
FIG. 9 is a cross-sectional view of a partially completed installation of the rock bolt assembly of FIG. 1.

Installation of the friction bolt assembly 100 will now be described with reference to FIGS. 9 and 10. Firstly, a bore hole 10 is drilled into the rock face 12 of a rock strata 11 to be stabilized. In the embodiment depicted, the bore hole 210 is drilled with a standard installation rig with a drill bit having a diameter typically of 43 to 44 mm, which will typically result in a bore hole diameter of 43 to 45 mm, depending on strata type and hardness. Accordingly, the maximum diameter of the friction bolt body 110 (being approximately 47 mm in a preferred embodiment) is slightly greater than the diameter of the bore hole 10, so as to provide for an interference fit in the usual manner, whilst the maximum diameter of the expansion element 130, here being approximately 43 mm, is less than the maximum diameter of the friction bolt body 110 and slightly less than the diameter of the bore hole 10 such that the expansion element 130 may be readily inserted into the bore hole 10.

Before inserting the friction bolt assembly 100 into the bore hole 10, a plate washer 170 (and optionally a ball washer) is mounted on the friction bolt body 110 adjacent the collar 117 and the friction bolt assembly 100 is mounted on the installation rig, particularly with the drive head 140 being received within a mating socket of the installation rig. The installation rig then drives the friction bolt assembly 100 into the bore hole 10, applying percussive force via the load transfer fitting 160 until the plate washer 170 is firmly engaged with the rock face 12. The frictional forces due to the interference fit between the friction bolt body 110 and bore hole wall 13 retain the friction bolt assembly 100 in the bore hole 10, and allow for the transfer of loads between the rock strata 11 and the friction bolt body 110.

Additional anchoring of the friction bolt body 110 in the bore hole 10 is achieved by way of the expansion element 130, which provides a point anchoring effect. This is achieved by actuating the rod 120 by rotating the drive head 140. Specifically, the drive head 140 is driven in a direction tending to advance the drive head 140 along the threaded trailing portion 124 of the rod 120 (here in an anti-clockwise direction). The threaded leading portion 123 of the rod 120 is provided with a like-handed thread (i.e., a thread having an identical orientation) to that of the threaded trailing portion 124, such that rotational driving of the drive head 140 does not tend to rotate the rod 120 in a direction that would withdraw the leading portion 123 of the rod 120 from the recess 133 in the expansion element 130.

Rotation of the rod 120 and the expansion element 130 is substantially prevented by virtue of the key 137 in the manner described above. Rotation of the drive head 140 accordingly draws the threaded trailing portion 124 of the rod 120 through the drive head 140 and also draws the expansion element 130 toward the friction bolt body trailing end 112, into the cavity 113. The engagement surface 136 of the expansion element 130 accordingly engages the friction bolt body 110 at the friction bolt body leading end 111 and radially outwardly deforms the friction bolt body 110 at the friction bolt body leading end 111 as shown in FIG. 10. In particular, the expansion element 130 is drawn fully into the tapered leading portion 115 of the friction bolt body 110, which is radially outwardly deformed by both the engagement surface 136 and mid-surface 135 of the expansion element 130, bearing the leading portion 115 of the friction bolt body 110 against the bore hole 10, thereby point anchoring the friction bolt body 110 within the bore hole 10.

Figure 10:
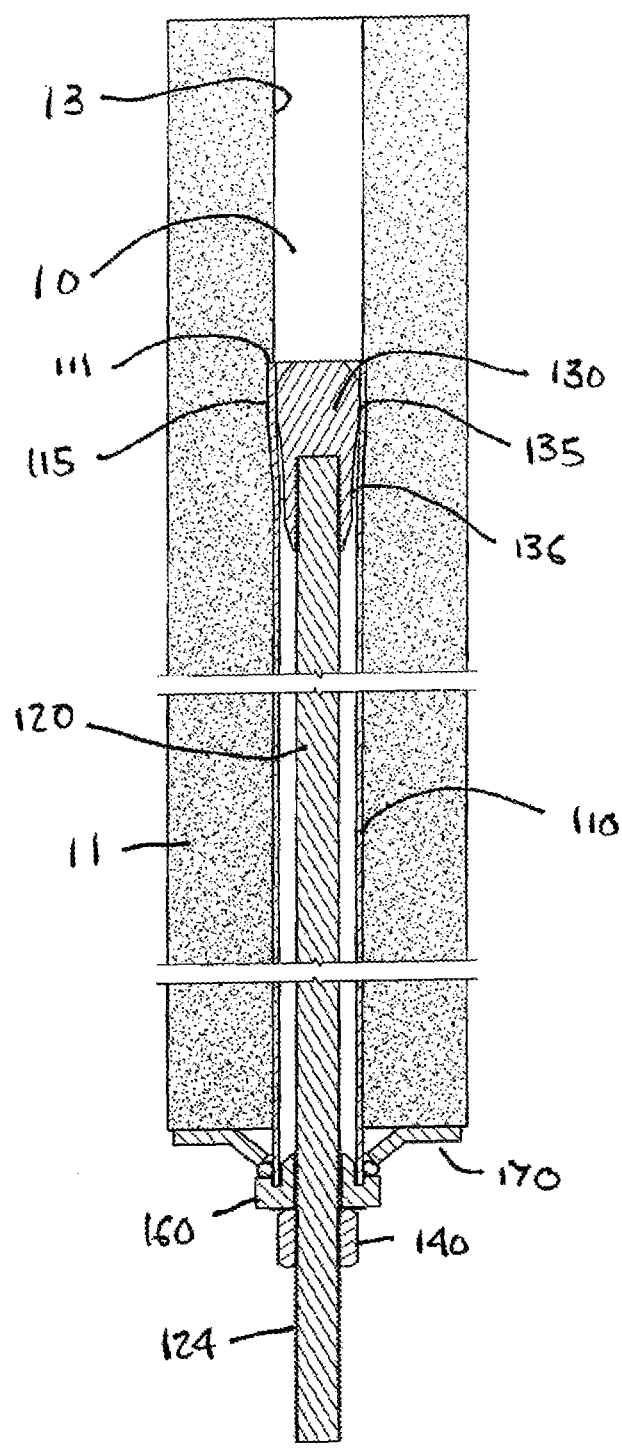
FIG. 10 is a cross-sectional view of the completed installation of FIG. 9.

As can be seen in FIG. 10, following installation and setting of the expansion element 130, the threaded trailing portion 124 of the rod 120 protrudes beyond the drive head 140. This allows installation of a roof mesh against the rock face 12, secured by a further plate washer and nut in the usual manner.

Figure 11:
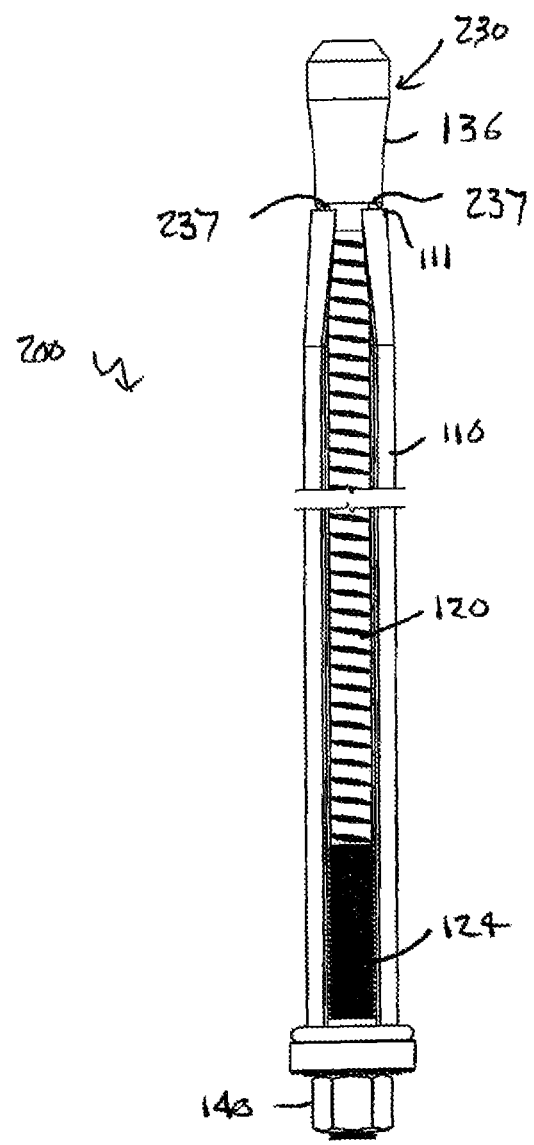
FIG. 11 is a front elevation view of a friction bolt assembly according to a second embodiment.
Figure 12:
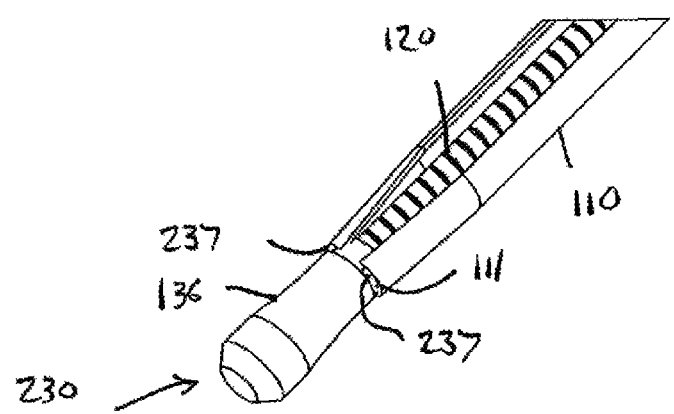
FIG. 12 is a fragmentary isometric view of the leading portion of the friction bolt assembly of FIG. 11.
Figure 13:
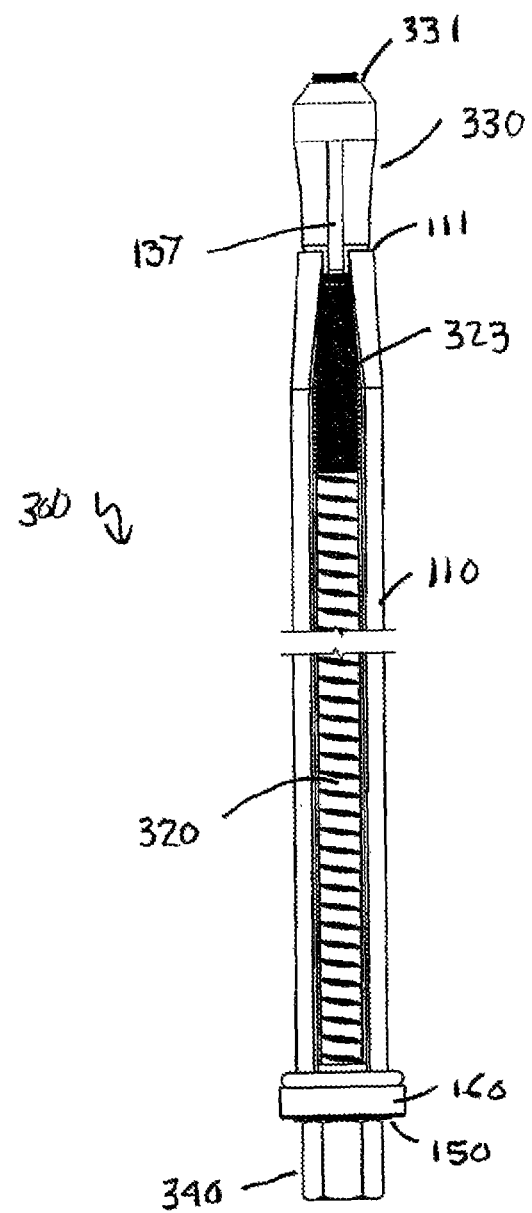
FIG. 13 is a front elevation view of a friction bolt assembly according to a third embodiment.
Figure 14:
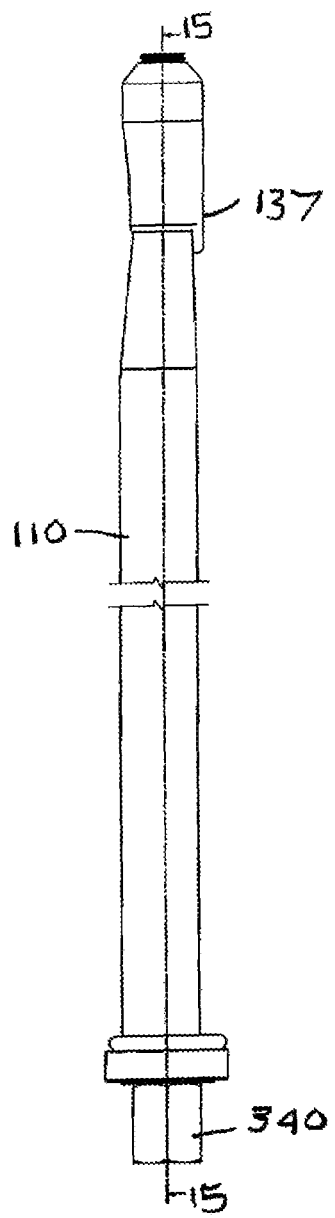
FIG. 14 is a side elevation view of the friction bolt assembly of FIG. 13.
Figure 18:
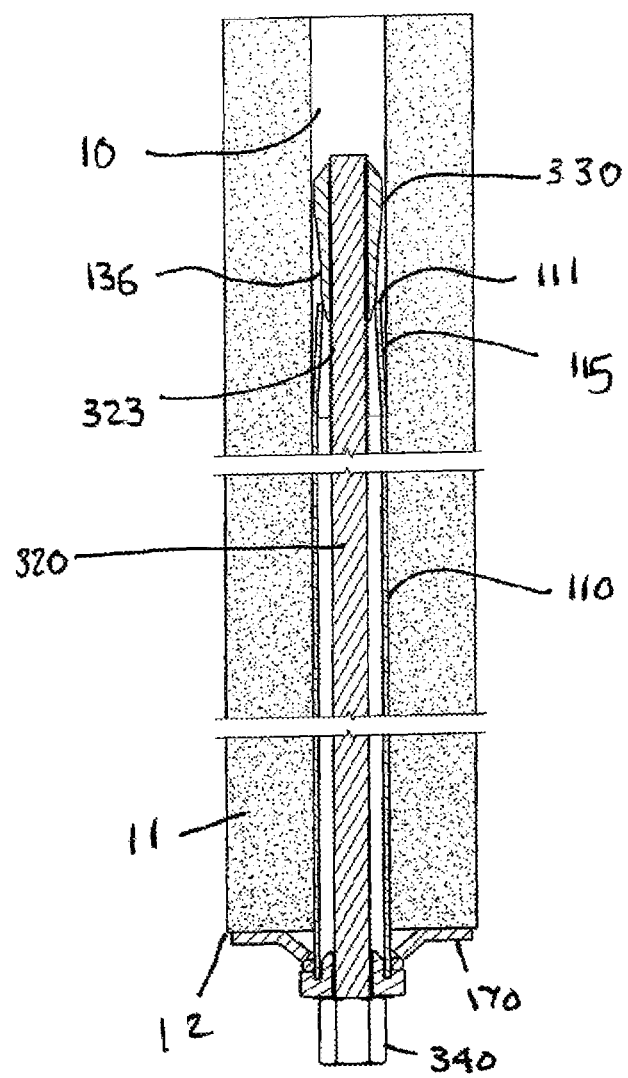
FIG. 18 is a cross-sectional view of a partially completed installation of the friction bolt assembly of FIG. 13.

A friction bolt assembly 200 according to a second embodiment is depicted in FIGS. 11 and 12 of the accompanying drawings. Features of the friction bolt assembly 200 that are identical to those of the friction bolt assembly 100 of the first embodiment are provided with identical reference numerals, whilst equivalent or alternate features of the friction bolt assembly 200 are provided with reference numerals equivalent to those of the friction bolt assembly 100 of the first embodiment, incremented by 100.

The friction bolt assembly 200 is identical to the friction bolt assembly 100, apart from the means provided for at least substantially preventing rotation of the expansion element 230 relative to the friction bolt body 110. Specifically, as an alternative to the key 137 of the friction bolt assembly 100 of the first embodiment, the expansion element 230 is fixed to the friction bolt body 110 by way of one or more tack welds 237. Specifically, the tack welds 237 fix the engagement surface 136 directly to the friction bolt body leading end 111. The welds 237 ensure that the expansion element 130 is retained in an engaged relationship with the friction bolt leading end 111 during transport and handling.

The friction bolt assembly 200 is installed in the same manner as the friction bolt assembly 100 of the first embodiment as described above. Upon application of torque to the drive head 140 during installation, the rod 120 and expansion element 230 are initially prevented from rotating relative to the friction bolt body 110 by virtue of the welds 237. As the trailing end portion 124 of the rod 120 is drawn through the drive head 140, tension in the rod 120 and accordingly the load acting on the welds 237, increases until the welds 237 fail. By the time the welds 237 fail, however, the tension developed in the rod 120 will be sufficient to provide a firm engagement of the tapered engagement surface 136 of the expansion element 130 with the friction bolt body leading end 111, sufficient to prevent rotation of the expansion element 130 as the drive head 140 is further rotationally driven. Accordingly, as with the key 137 of the friction bolt assembly 100 of the first embodiment, assurance is given to the operator that the expansion element 130 is engaging and radially expanding friction bolt body 110, rather than merely freely rotating as the drive head 140 is driven.

A friction bolt assembly 300 according to a third embodiment is depicted in FIGS. 13 to 17. Again, features of the friction bolt assembly 300 that are identical to those of the friction bolt assembly 100 of the first embodiment are provided with identical reference numerals, whilst equivalent or alternate features are provided with equivalent reference numerals, incremented by 200.

The friction bolt assembly 300 is similar to the friction bolt assembly 100 of the first embodiment, except that, rather than having a drive head 140 threadingly mounted on a rod 120, and expansion element 130 effectively fixed in relation the rod 120, in the friction bolt assembly 300 the drive head 340 is fixed in relation to the rod 320 whilst the expansion element 330 is threadingly mounted on the rod 330. The friction bolt body 110 of the friction bolt assembly 300 is identical to that of the friction bolt assembly 100.

The expansion element 330 is identical to the expansion element 130 of the friction bolt assembly 100 of the first embodiment, except that the threaded aperture 333 extends through the full length of the expansion element 330 through the expansion element leading end 331. The threaded leading portion 323 of the rod 320 is of an increased length to provide for displacement of the threaded leading portion 323 through the expansion element 330 during installation, as will be described below. A sacrificial plastic sheathing may cover the exposed region of the threaded leading portion 323 so as to avoid the thread of the threaded leading portion 323 being fouled by debris during transport and handling in the mine The drive head 340 is in the form of a blind hexagonal nut that is threadingly mounted on a shorter threaded trailing portion 324 of the rod 320. The drive head 340 is mounted on the threaded trailing portion 324 of the rod 320 in a manner that results in the trailing portion 324 of the rod 320 engaging the blind end of the drive head 340 during driving of the drive head 340 during installation, such that the drive head 340 effectively remains fixed in relation to the rod 320. In alternate forms, the drive head 340 may be mounted on the rod 320 by alternate means, such as welding, or may alternatively be integrally formed with the rod 320.

As with the friction bolt assembly 100 of the first embodiment, a washer 150 and load transfer fitting 160 are mounted on the rod 320 between the drive head 340 and the friction bolt body trailing end 112.

Figure 19:
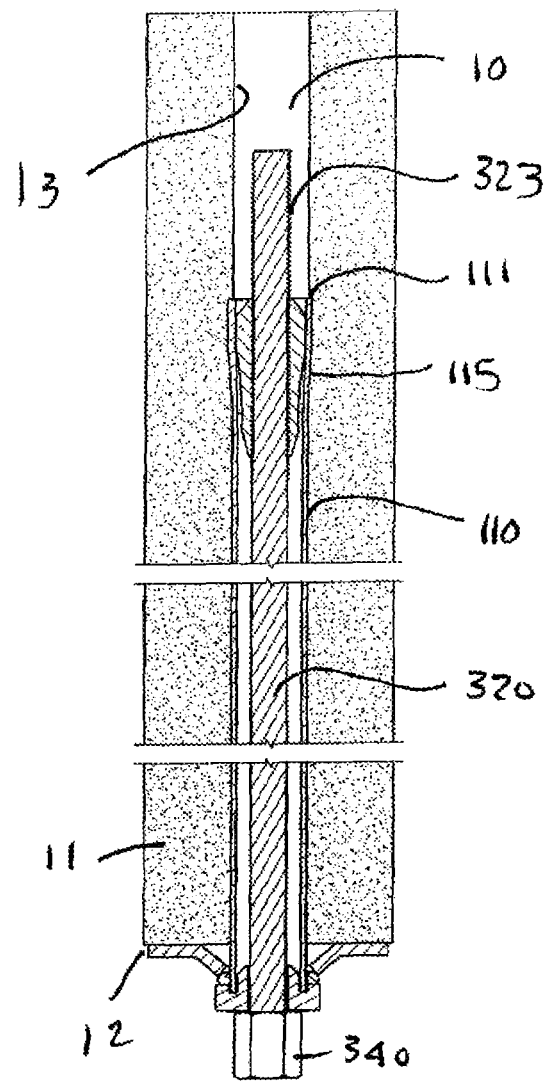
FIG. 19 is a cross-sectional view of the completed installation of FIG. 18.
Figure 20:
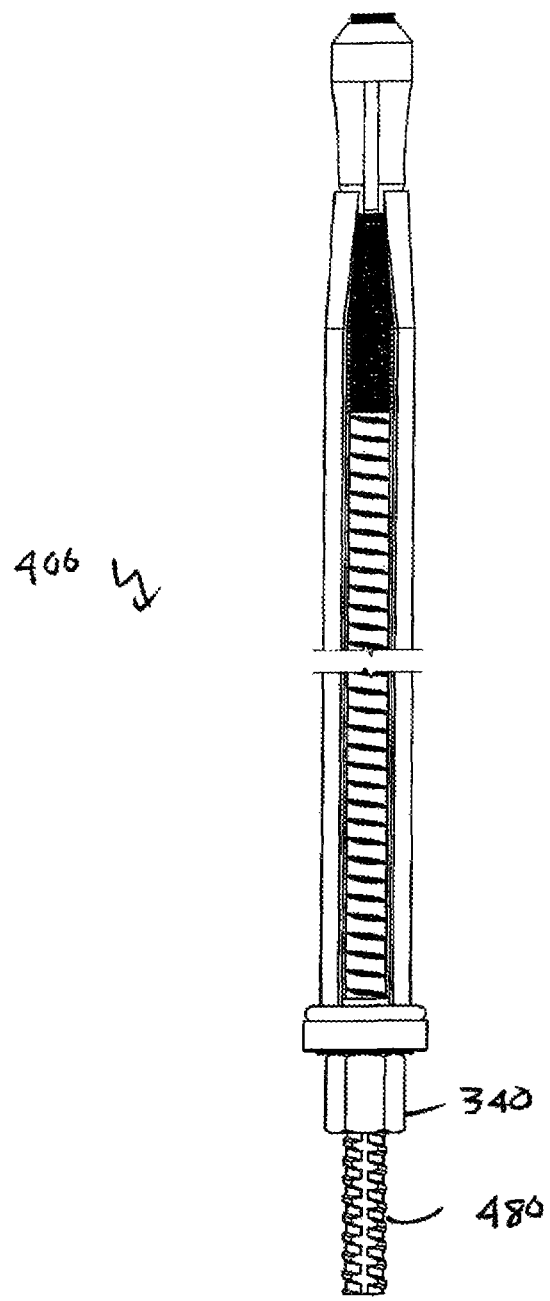
FIG. 20 is a front elevation view of a friction bolt assembly according to a fourth embodiment.
Figure 24:
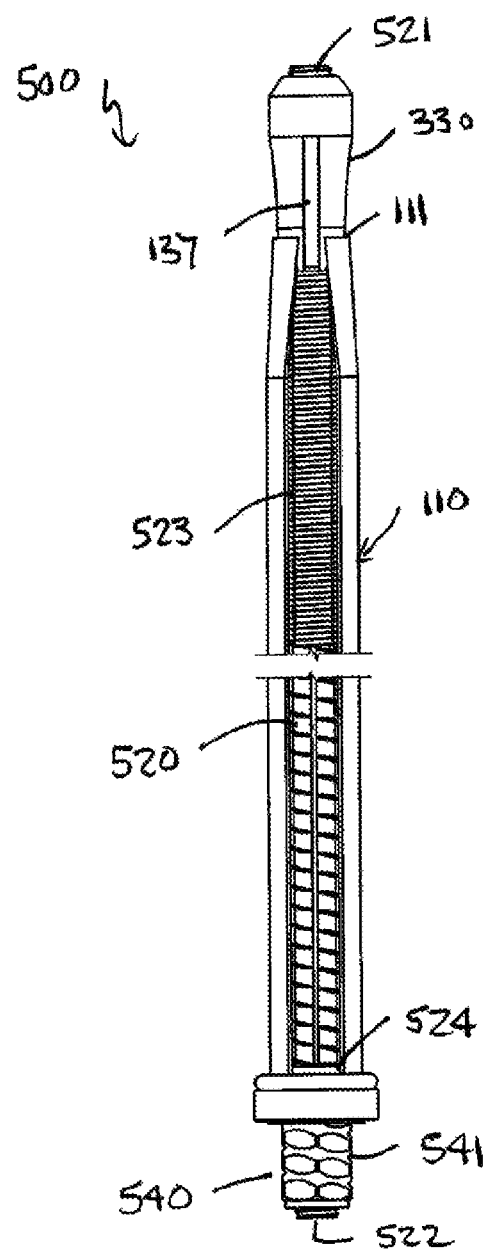
FIG. 24 is a front elevation view of a friction bolt assembly according to a fifth embodiment.
Figure 25:
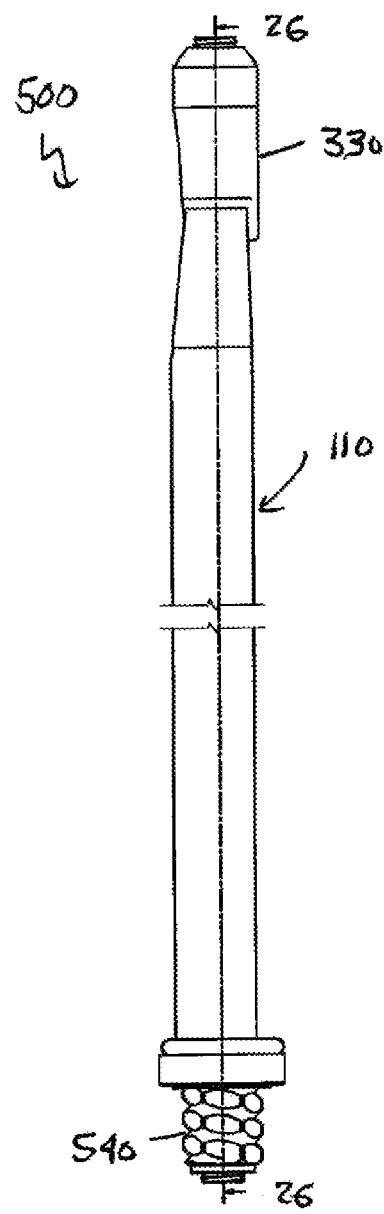
FIG. 25 is a side elevation view of the friction bolt assembly of FIG. 24.
Figure 26:
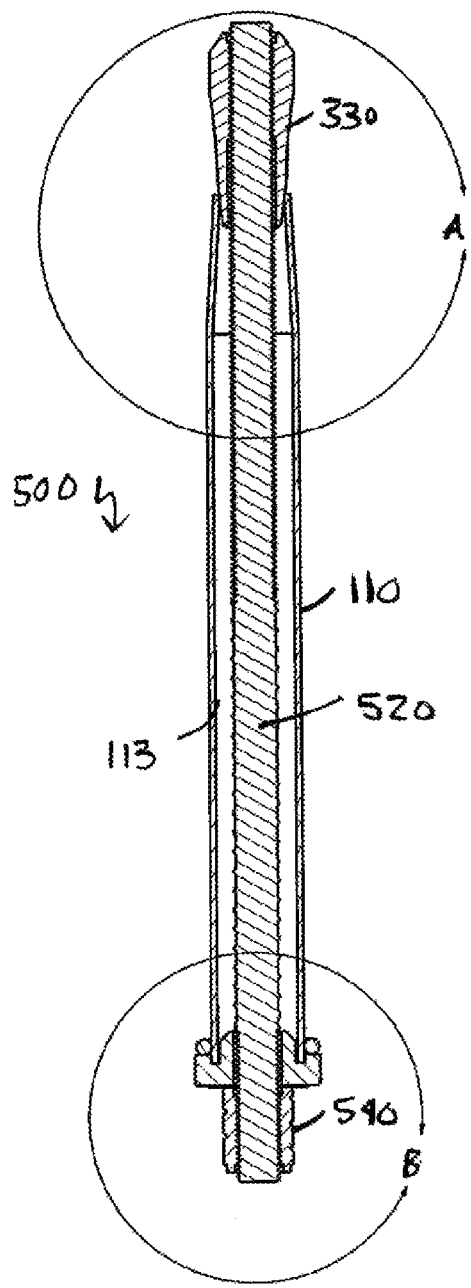
FIG. 26 is a cross-sectional view of the friction bolt assembly of FIG. 24, taken at section 26-26 of FIG. 25.
Figure 27:
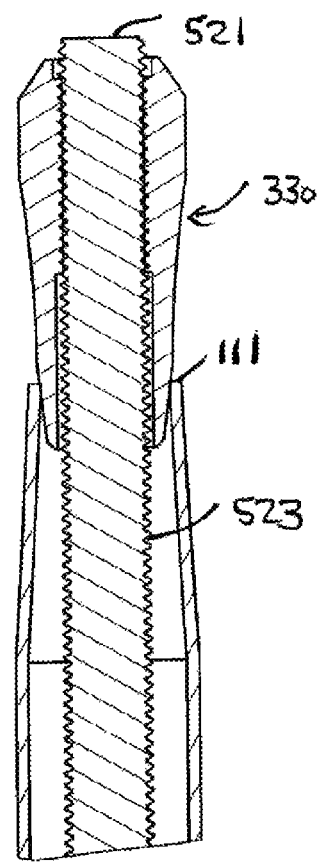
FIG. 27 is an enlarged view of detail A of FIG. 26.
Figure 28:
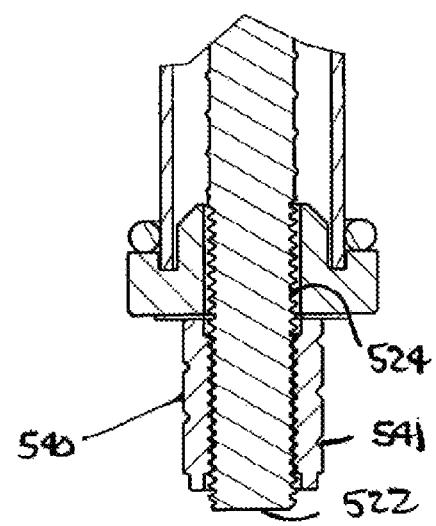
FIG. 28 is an enlarged view of detail B of FIG. 26.

Installation of the friction bolt assembly 300 will now be described with reference to FIGS. 19 and 20. A bore hole 10 is first drilled into the rock face 12 of the rock strata 11 to be stabilized, in the same manner as described above in relation to the first embodiment. The friction bolt assembly 300 is then installed into the bore hole 10 utilizing an installation rig in the same general manner as described above, firstly applying percussive force by the drive head 340 to drive the friction bolt assembly 300 into the bore hole 10 until the plate washer 170 is firmly engaged with the rock face 12.

Additional anchoring of the friction bolt body 110 in the bore hole 10 is then again achieved by way of the expansion element 330 by actuating the rod 320 by rotating the drive head 340. Rotation of the drive head 340 rotates the rod 320. Rotation of the expansion element 330 is again at least substantially prevented by way of the key 137 (or alternatively by way of welds 237, as described in relation to the second embodiment). Accordingly, rotation of the rod 320 draws the expansion element 330 along the threaded leading portion 323 of the rod 320 toward the friction bolt body trailing end 112 into the cavity 113, as depicted in FIG. 19. Accordingly, the engagement surface 136 again engages the friction bolt body 110 and radially outwardly deforms the tapered leading end portion 115 of the friction bolt body 110, bearing against the bore hole wall 13 to provide a point anchoring effect.

The configuration of the friction bolt assembly 300 avoids the overhang of the rod 120 from the drive head 140 that occurs with the friction bolt assembly 100 of the first embodiment, thereby providing a lower profile installation which may be of importance for low mine ceiling heights. Instead, the threaded leading portion 323 of the rod 320 protrudes beyond the expansion element 330.

A friction bolt assembly 400 according to a fourth embodiment is depicted in FIGS. 20 to 23. Features of the friction bolt assembly 400 that are identical to those of the friction bolt assembly 300 of the third embodiment are provided with identical reference numerals.

The friction bolt assembly 400 of the fourth embodiment is identical to the friction bolt assembly 300 of the third embodiment, except that a coarsely threaded bar 480 is fixed to the trailing face of the drive head 340, and extends longitudinally therefrom. The threaded bar 480 may be fixed to the trailing face of the drive head 340 by welding, although it is also envisaged the coarsely threaded bar may be fixed by other means, included by threaded engagement with a mating internal thread formed in the rear of the drive head 340. The coarsely threaded bar 480 allows for securing of a roof mesh to the friction bolt assembly 400 after installation in the same manner that a roof mesh may be secured to the protruding threaded trailing portion 124 of the rod 120 of the friction bolt assembly 100 of the first embodiment. Installation of the friction bolt assembly 400 is identical to that described above in relation to the friction bolt assembly 300 of the first embodiment.

A friction bolt assembly 500 according to a fifth embodiment is depicted in FIGS. 24 to 28. Features of the friction bolt assembly 500 that are identical to those of the friction bolt assemblies as described above are provided with identical reference numerals. Equivalent or alternate features are provided with reference numerals equivalent to those set out above, incremented accordingly.

The friction bolt assembly 500 is similar to the friction bolt assembly 300 of the third embodiment except that, rather than having the drive head 540 fixed in relation to the rod 520, the drive head 540 is in the form of an open hexagonal nut that is threadingly mounted on a threaded trailing portion 524 of the rod 520 in the same manner as the drive head 140 of the friction bolt assembly 100 of the first embodiment. The threaded leading portion 523 and threaded trailing portion 524 of the rod 520 are like handed, each having a left handed thread for installation with a standard installation rig configured to rotate in an anti-clockwise direction, although it is also envisaged that both the threaded leading portion 523 and threaded trailing portion 524 may be right handed, for installation by clockwise rotation of an installation rig.

To initially secure the expansion element 330 and drive head 540 on the rod 520 during transportation and handling, the expansion element 330 may be tack welded to the rod 520 adjacent the rod leading end 521 and the drive head 540 tack welded to the rod 520 adjacent the rod trailing end 522. The tack welds would then fail during rotation of the expansion element 330 and drive head 540 relative to the rod 520 during installation. Alternatively, after mounting the expansion element 330 and drive head 540 on the rod 520, the thread of the threaded leading portion 523 and threaded trailing portion 524 of the rod 520 may be crimped or otherwise deformed adjacent to the rod leading and trailing ends 521, 522 respectively. The expansion element 330 and drive head 540 may then be reverse threaded to abut against the crimp to temporarily lock the expansion element 330/drive head 540 to the rod 520 and specifically prevent the expansion element 330 and drive head 540 from unscrewing off the rod 520 during transport and handling. As another alternative, heat shrink material may be applied over the expansion element 330 and adjacent portion of the threaded leading portion 523 of the rod 520, both to protect the expansion element 330 during transport and any rough handling and also to secure the expansion element 330 on the rod 520. During installation, the heat shrink would be torn away by rotation of the rod 520, allowing relative movement between the expansion head 330 and rod 520. As another alternative, the drive head 540 may be driven along the threaded trailing portion 524 of the rod 520 sufficiently to provide a light pretension of the rod 520, forcibly engaging the expansion element 530 and drive head 540 with the rod leading and trailing ends 521, 522 respectively.

In the configuration depicted, the drive head 540 is provided with a coarse thread 541 on its hexagonal drive faces to allow for securing of a roof mesh to the friction bolt assembly 500 after installation in the same manner that a roof mesh may be secured to the coarsely threaded bar 480 of the friction bolt assembly 400 of the fourth embodiment described above, or the protruding threaded trailing portion 124 of the rod 120 of the friction bolt assembly 100 of the first embodiment as described above. Such an externally coarsely threaded configuration of drive head may also be applied to the other embodiments described above.

Installation of the friction bolt assembly 500 is generally as described above in relation to the friction bolt assembly 100 of the first embodiment. After insertion and initial anchoring of the friction bolt assembly 500 into a bore hole, additional anchoring of the friction bolt body 110 in the bore hole is again achieved by way of the expansion element 330 providing a point anchoring effect. This is again achieved by actuating the rod 520 by rotation of the drive head 540. Again, the drive head 540 is driven in a direction tending to advance the drive head 540 along the threaded trailing portion 524 of the rod 520, in an anti-clockwise direction for a left handed thread, as noted above. During rotation of the drive head 540, as tension in the rod 520 increases, friction due to inter-engagement of the threaded trailing portion 524 of the rod 520 with the internal thread of the drive head 540 will tend to rotate the rod 520. This in turn will tend to advance the threaded leading portion 523 of the rod 520 through the expansion element 330, rotation of which is substantially prevented by virtue of the key 137 as described above in relation to the first embodiment. Accordingly, during rotation of the drive head 540, the expansion element 330 will be drawn toward the friction bolt body trailing end 112 into the cavity 113, tending to outwardly deform the friction bolt body 110 at the friction bolt body leading end 111.

The rod leading and trailing ends 521, 522 will tend to protrude through the open ends of the expansion element 330 and drive head 540 respectively. Protrusion of the rod trailing end 522 through the drive head 540 will provide a visual confirmation that the point anchoring of the friction bolt body 110 within the bore hole has been achieved. Given that, as opposed to the embodiments described above, the rod 520 will travel both through the expansion element 330 and the drive head 540, the distance by which the threaded trailing portion 523 of the rod 520 protrudes from the drive head 540 upon completion of installation will generally be less than would occur with the friction bolt assembly 100 of the first embodiment described above. It is for this reason that the coarsely externally threaded form of the drive head 540 may be useful for securing a roof mesh.

Figure 29:
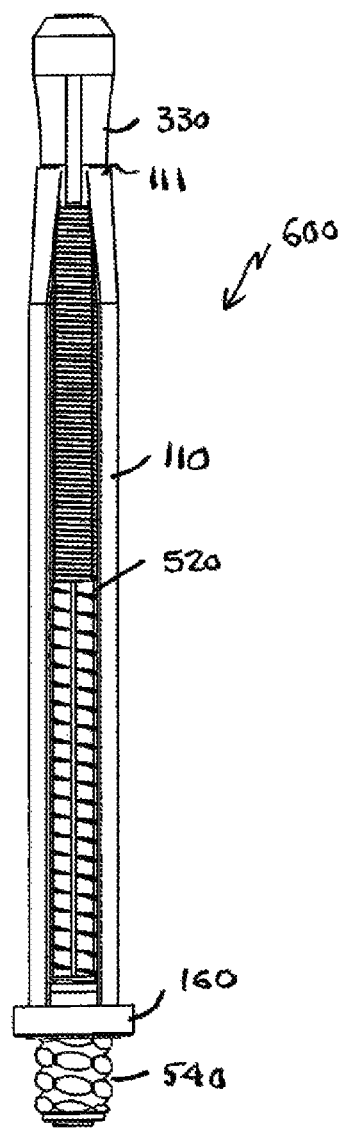
FIG. 29 is an isometric view of a friction bolt assembly according to a sixth embodiment.
Figure 30:
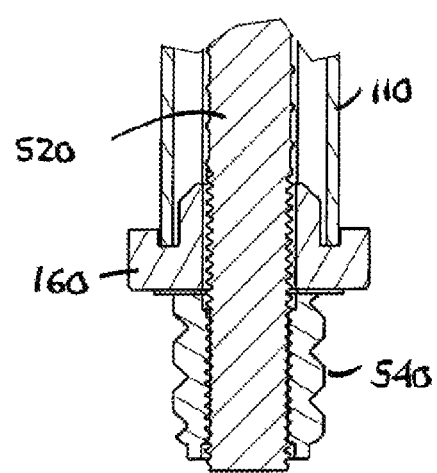
FIG. 30 is an enlarged cross-sectional view of the trailing end region of the friction bolt assembly of FIG. 29.
Figure 31:
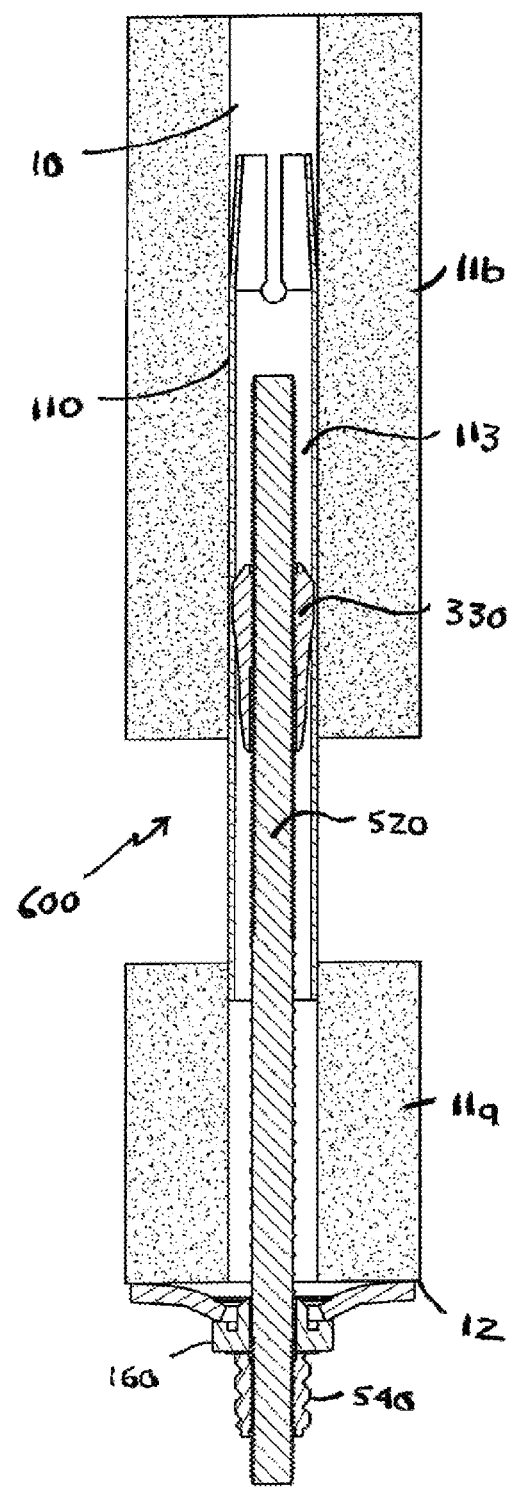
FIG. 31 is a cross-sectional view of an installation of the friction bolt assembly of FIG. 29 following a rock burst or seismic event.

A friction bolt assembly 600 according to a sixth embodiment is depicted in FIGS. 29 to 31. Features of the friction bolt assembly 600 that are identical to those of the friction bolt assemblies as described above are provided with identical reference numerals. Equivalent or alternate features are provided with reference numerals equivalent to those set out above, incremented accordingly.

The friction bolt assembly 600 is substantially identical to the friction bolt assembly 500 of the fifth embodiment, except that the collar 117, welded to the friction bolt body of each of the embodiments described above, is omitted. The friction bolt assembly 600 is installed in the same manner as described above in relation to friction bolt assembly 500 of the fifth embodiment.

The friction bolt assembly 600 may be particularly suitable for installations where dynamic loading may result from significant rock bursts or other seismic events, as may particularly occur in hard rock mining applications. On the occurrence of such a rock burst or other seismic event, resulting in significant movement of the rock, the rock bolt assembly 600 is able to yield by allowing relative longitudinal displacement between the rod 520 and expansion element 330. Such an installation is depicted in FIG. 31, where a rock burst has resulted in a lower rock strata layer 11a being displaced from an upper rock strata layer 11b, to which the rock bolt assembly 600 has been point anchored by way of radially outward deformation of the friction bolt body leading end 111 through action of the expansion element 330. Rather than displacement of the lower rock strata layer 11a causing initial yielding of the rod 520 and friction bolt body 110, followed by catastrophic failure, the friction bolt body 110 is able to remain anchored to the upper rock strata layer 1b, with the lower portion of the friction bolt body 110 passing up through the bore hole 10 within the lower rock strata layer 11a. This is enabled by the absence of the collar 117 that would otherwise engage the rock face 12 and prevent movement of the friction bolt body 110 along the bore hole 10. With the rod 520 being fixed in relation to the drive head 540 and load transfer fitting 160, the rod 520 and expansion head 330 remain fixed in relation to the lower strata layer 11a and thus displaces with the lower rock strata layer 11a relative to the friction bolt body 110 and upper rock strata layer 11b. This is achieved by displacement of the expansion element 330 along the cavity 113 of the friction bolt body 110 under a relatively constant load resulting from the outward deformation of the friction bolt body 110 as the expansion element 330 passes therethrough. The integrity of the friction bolt assembly installation is thus maintained.

The person skilled in the art will appreciate other possible modifications and configurations of the friction bolt assembly described above. In particular, it is envisaged that the means for at least substantive preventing rotation of the expansion element relative to the friction bolt body may take any of various alternate forms. In place of the key 137 described above, the means may include alternate surface features of the expansion element, configured to engage the friction bolt body. Such alternate surface features might include, for example, a roughened or knurled configuration of the engagement surface of the expansion element.

What is claimed is:

1. A friction bolt assembly comprising:
   a generally tubular friction bolt body longitudinally extending between a friction bolt body leading end and a friction bolt body trailing end, said friction bolt body defining a cavity longitudinally extending through said friction bolt body and having a split longitudinally extending along said friction bolt body to said friction bolt body leading end, said friction bolt body leading end having a maximum external diameter, said friction bolt body having a cylindrical primary portion and a tapered leading portion extending from said cylindrical primary portion to said friction bolt leading end, said cylindrical primary portion having an external diameter, said tapered leading portion tapering toward said friction bolt body leading end such that the maximum external diameter of said friction bolt leading end is smaller than the external diameter of said cylindrical primary portion, said friction bolt body having a constant wall thickness;
   a rod longitudinally extending through said cavity between a rod leading end and a rod trailing end;
   an expansion element mounted on, or integrally formed with, said rod and protruding through said friction bolt body leading end, said expansion element having an engagement surface tapering toward said rod trailing end; and
   a drive head mounted on, or integrally formed with, said rod at or adjacent said rod trailing end and adjacent said friction bolt body trailing end, said rod being actuatable by rotation of said drive head to draw said expansion element toward said friction bolt body trailing end such that said engagement surface engages said friction bolt body at said friction bolt body leading end, radially outwardly deforming said friction bolt body at said friction bolt body leading end;
   wherein said friction bolt assembly further comprises means for at least substantially preventing rotation of said expansion element relative to said friction bolt body; and
   wherein said friction bolt body extends over a majority of the length of said rod.

2. The friction bolt assembly of claim 1 wherein said expansion element is located at or adjacent said rod leading end.

3. The friction bolt assembly of claim 1, wherein said means comprises a surface feature of said expansion element configured to engage said friction bolt body.

4. The friction bolt assembly of claim 3, wherein said surface feature comprises a key projecting from said engagement surface into said split.

5. The friction bolt assembly of claim 1, wherein said means comprises one or more welds fixing said expansion element to said friction bolt body, said one or more welds being configured to fail upon application of a predetermined load tending to draw said expansion element toward said friction bolt body trailing end.

6. The friction bolt assembly of claim 1, wherein said drive head is threadingly mounted on a threaded trailing portion of said rod such that, upon actuation of said rod by rotation of said drive head, said threaded trailing portion of said rod is drawn through said drive head.

7. The friction bolt assembly of claim 6, wherein said expansion element remains fixed in relation to said rod during said actuation of said rod.

8. The friction bolt assembly of claim 6, wherein said expansion element is threadingly mounted on a threaded leading portion of said rod, said threaded leading portion and said threaded trailing portion of said rod being like-handed.

9. The friction bolt assembly of claim 1, wherein said expansion element is threadingly mounted on a threaded leading portion of said rod such that, upon actuation of said rod by rotation of said drive head, said rod rotates with said drive head, drawing said expansion element along said threaded leading portion of said rod.

10. The friction bolt assembly of claim 9, wherein said drive head remains fixed in relation to said rod during said actuation.

11. The friction bolt assembly of claim 1, wherein said friction bolt assembly further comprises a load transfer fitting mounted on said rod between said drive head and said friction bolt body trailing end, said load transfer fitting having a profiled leading face configured to engage and support said friction bolt body trailing end and transfer load from said load transfer fitting to said friction bolt body.

12. The friction bolt assembly of claim 11, wherein said profiled leading face of said load transfer fitting defines an annular recess for receipt of said friction bolt body trailing end.

13. A method of installing the friction bolt assembly of claim 1, comprising the steps of:
drilling a bore hole into a rock face of a rock strata to be stabilized, said bore hole having a diameter greater than the maximum diameter of said expansion element and less than the maximum diameter of said friction bolt body in an underformed state;
inserting said friction bolt assembly into said bore hole with said expansion element leading;
applying percussive force to said friction bolt body to drive said friction bolt body into said bore hole with an interference fit;
rotating said drive head to actuate said rod, drawing said expansion element towards said friction bolt body trailing end and engaging said engagement surface with said friction bolt body at said friction bolt leading end, thereby outwardly radially deforming said friction bolt body at said friction bolt body leading end into bearing engagement with the wall of said bore hole.

14. A friction bolt assembly comprising:
a generally tubular friction bolt body longitudinally extending between a friction bolt body leading end and a friction bolt body trailing end, said friction bolt body having an external diameter, said friction bolt body defining a cavity longitudinally extending through said friction bolt body and having a split longitudinally ding along said friction bolt body to said friction bolt body leading end, said friction bolt body leading end having a maximum external diameter and a maximum internal diameter, said friction bolt body having a cylindrical primary portion and a tapered leading portion extending from said cylindrical primary portion to said friction bolt leading end, said cylindrical primary portion having an external diameter, said tapered leading portion tapering toward said friction bolt body leading end such that the maximum external diameter of said friction bolt leading end is smaller than the external diameter of said primary portion, said friction bolt body having a constant wall thickness;
a rod longitudinally extending through said cavity between a rod leading end and a rod trailing end;
an expansion element mounted on, or integrally formed with, said rod and protruding through said friction bolt body leading end, said expansion element having an engagement surface tapering toward said rod trailing end, said engagement surface having a maximum diameter; and
a drive head mounted on, or integrally formed with, said rod at or toward said rod trailing end and adjacent said friction bolt body trailing end, said rod being actuatable by rotation of said drive head to draw said expansion element toward said friction bolt body trailing end such that said engagement surface engages said friction bolt body at said friction bolt body leading end, radially outwardly deforming said friction bolt body at said friction bolt body leading end;
wherein the maximum diameter of said engagement surface is greater than the maximum internal diameter of said friction bolt body leading end and less than the external diameter of said friction bolt body; and
wherein said friction bolt body extends over a majority of the length of said rod.

15. The friction bolt assembly of claim 14 wherein said expansion element is located at or adjacent said rod leading end.

16. The friction bolt assembly of claim 14, wherein said drive head is threadingly mounted on a threaded trailing portion of said rod such that, upon actuation of said rod by rotation of said drive head, said threaded trailing portion of said rod is drawn through said drive head.

17. The friction bolt assembly of claim 16, wherein said expansion element remains fixed in relation to said rod during said actuation of said rod.

18. The friction bolt assembly of claim 16, wherein said expansion element is threadingly mounted on a threaded leading portion of said rod, said threaded leading portion and said threaded trailing portion of said rod being like-handed.

19. The friction bolt assembly of claim 14, wherein said expansion element is threadingly mounted on a threaded leading portion of said rod such that, upon actuation of said rod by rotation of said drive head, said rod rotates with said drive head, drawing said expansion element along said threaded leading portion of said rod.

20. The friction bolt assembly of claim 19, wherein said drive head remains fixed in relation to said rod during said actuation.

21. The friction bolt assembly of claim 14, wherein said friction bolt assembly further comprises a load transfer fitting mounted on said rod between said drive head and said friction bolt body trailing end, said load transfer fitting having a profiled leading face configured to engage and support said friction bolt body trailing end and transfer load from said load transfer fitting to said friction bolt body.

22. A method of installing the friction bolt assembly of claim 14, comprising the steps of:
drilling a bore hole into a rock face of a rock strata to be stabilized, said bore hole having a diameter greater than the maximum diameter of said expansion element and less than the maximum diameter of said friction bolt body in an underformed state;
inserting said friction bolt assembly into said bore hole with said expansion element leading;
applying percussive force to said friction bolt body to drive said friction bolt body into said bore hole with an interference fit;
rotating said drive head to actuate said rod, drawing said expansion element towards said friction bolt body trailing end and engaging said engagement surface with said friction bolt body at said friction bolt leading end, thereby outwardly radially deforming said friction bolt body at said friction bolt body leading end into bearing engagement with the wall of said bore hole.

23. The friction bolt assembly of claim 21, wherein said profiled leading face of said load transfer fitting defines an annular recess for receipt of said friction bolt body trailing end.

* * * * *